United States Patent
Gerard

(10) Patent No.: US 12,468,142 B2
(45) Date of Patent: Nov. 11, 2025

(54) OPTOELECTRONIC TRANSMITTER WITH FAST ANGULAR SCANNING

(71) Applicant: Commissariat à l'Energie Atomique et aux Energies Alternatives, Paris (FR)

(72) Inventor: Jean-Michel Gerard, Grenoble (FR)

(73) Assignee: Commissariat à l'Energie Atomique et aux Energies Alternatives, Paris (FR)

(*) Notice: Subject to any disclaimer, the term of this patent is extended or adjusted under 35 U.S.C. 154(b) by 789 days.

(21) Appl. No.: 17/652,947

(22) Filed: Mar. 1, 2022

(65) Prior Publication Data
US 2022/0283426 A1 Sep. 8, 2022

(30) Foreign Application Priority Data
Mar. 2, 2021 (FR) .................. 21 01993

(51) Int. Cl.
G02B 26/00 (2006.01)
(52) U.S. Cl.
CPC ............... G02B 26/001 (2013.01)
(58) Field of Classification Search
None
See application file for complete search history.

(56) References Cited

U.S. PATENT DOCUMENTS

| | | | | |
|---|---|---|---|---|
| 2,509,235 | A * | 5/1950 | Kandoian | H03K 3/78 331/96 |
| 5,648,786 | A | 7/1997 | Chung et al. | |
| 2005/0063438 | A1 * | 3/2005 | Capasso | H01S 5/187 372/50.21 |
| 2007/0217045 | A1 * | 9/2007 | Chen | G02B 5/28 359/891 |
| 2008/0042782 | A1 | 2/2008 | Wang et al. | |
| 2008/0273208 | A1 | 11/2008 | Johansen et al. | |
| 2010/0279394 | A1 * | 11/2010 | Bocking | H01S 5/34 977/773 |
| 2021/0041612 | A1 * | 2/2021 | Cleary | G02B 5/284 |

FOREIGN PATENT DOCUMENTS

WO WO 2006/110041 A1 10/2006

OTHER PUBLICATIONS

French Preliminary Search Report issued Nov. 10, 2021 in French Application 21 01993 filed on Mar. 2, 2021, 10 pages (with English Translation of Categories of Cited Documents & Written Opinion).

* cited by examiner

*Primary Examiner* — Jyotsna V Dabbi
(74) *Attorney, Agent, or Firm* — Oblon, McClelland, Maier & Neustadt, L.L.P.

(57) ABSTRACT

An optoelectronic emitter with angular scanning, comprising an array of resonant cavities each extending longitudinally along a first axis, each configured to emit, via their emission face, an elementary light beam at a resonant frequency specific to each resonant cavity, in response to a pulsed optical excitation signal designed configured to illuminate and to excite all of the resonant cavities simultaneously. The resonant cavities, and configured to exhibit a variation in resonant frequencies from one resonant cavity to the next, along a second axis of the array perpendicular to the first axis. The (angular scanning of the optoelectronic emitter takes place in a plane perpendicular to that of the substrate and containing the second axis.

15 Claims, 5 Drawing Sheets

OPTOELECTRONIC TRANSMITTER WITH FAST ANGULAR SCANNING

TECHNICAL FIELD

The field of the invention is that of optoelectronic emitters designed to transmit a light beam through free space which angularly scans an angular sector in the far field in a very short time, for example shorter than a nanosecond.

PRIOR ART

There exist optoelectronic emitters that allow a light beam to be transmitted through free space in a predefined main direction. They find application in particular in the field of light detection and ranging (LIDAR), but also in the fields of free-space optical communications, holographic screens and medical imaging, inter alia.

One example is optical-phased-array (OPA) optoelectronic emitters. Optoelectronic emitters of this type typically comprise an optical source emitting a coherent and monochromatic optical signal which is subsequently distributed into a plurality of waveguides. Each waveguide comprises a phase shifter and an elementary emitter forming an optical antenna. The optical antennas transmit an elementary light beam through free space, for example by scattering, these light beams then interfering with one another to form a main light beam. This has a radiation pattern in the far field whose main direction is dependent, in particular, on the relative phase applied by the phase shifters to the light beams propagating through the plurality of waveguides.

To have the main light beam rapidly scan an angular sector, for example to scan an angular sector of the order of 10 mrad in a time of the order of a nanosecond or less, it would be necessary for the elementary light beams to have a relative phase exhibiting a very short temporal variation. However, this is particularly difficult, or even impossible, to achieve with thermooptic phase shifters, or even with electrorefractive phase shifters. In addition, such an optoelectronic emitter would require complex management of the temporal variation in the relative phase to be imposed, and its power consumption could be substantial.

It should be noted that there also exist optical emitters that comprise a mechanical device for performing the angular scanning, as described, for example, in document EP2397882A1. However, the scanning speed remains relatively low due to constraints inherent to the elements of the mechanical device (rotational guidance provided by ball bearings or flexible pivots, torque motor, etc.).

SUMMARY OF THE INVENTION

The objective of the invention is to at least partially remedy the drawbacks of the prior art, and more particularly to provide an optoelectronic emitter allowing fast scanning of a predefined angular sector in a time of the order of a nanosecond or less, by means of a main light beam exhibiting low angular divergence with respect to the angular width of the scanned sector.

For that, the subject of the invention is an optoelectronic emitter with angular scanning, comprising an array of resonant cavities, resting on a substrate defining a main plane, the resonant cavities being:
arranged parallel to one another and each extending longitudinally along a first axis of the array,
each formed of a stack of two opposing reflectors and of an interlayer located between the reflectors, and having an emission face opposite the substrate,
each designed to emit, via the emission face, what is referred to as an elementary light beam at a resonant frequency to) specific to each resonant cavity, in response to a pulsed optical excitation signal designed to illuminate and to excite all of the resonant cavities simultaneously,
configured to exhibit a variation in resonant frequencies $f_{r(i)}$ from one resonant cavity to the next, along a second axis of the array perpendicular to the first axis, the angular scanning of the optoelectronic emitter then taking place in a plane perpendicular to that of the substrate and containing the second axis.

In addition, each resonant cavity has a light storage time $\tau_{(i)}$, which is dependent on reflection coefficients of the reflectors, on a thickness and on a refractive index of the intermediate layer.

The optoelectronic emitter also comprises an optical source designed to emit said pulsed optical excitation signal so as to illuminate and to excite all of the resonant cavities simultaneously. This pulsed signal is a coherent signal, with a pulse duration $\Delta t_e$ shorter than the light storage time $\tau_{(i)}$ of each of the resonant cavities, and with a spectral width $\Delta f_e$ centred on a central frequency $f_e$, $\Delta f_e$ and $f_e$ being predefined so as to cover the range of resonant frequencies $f_{r(i)}$ of the resonant cavities.

The following are certain preferred but non-limiting aspects of this optoelectronic emitter.

The resonant cavities may be configured such that the variation in resonant frequencies $f_{r(i)}$ is monotonic.

The variation in resonant frequencies $f_{r(i)}$ may result from a variation, along the second axis of the array: in a thickness of the interlayers, from one resonant cavity to the next, the thickness being defined along an axis perpendicular to the main plane, and/or in a refractive index of the interlayers, from one resonant cavity to the next.

The resonant cavities may be pads that are distinct from one another distributed over the substrate and each delimited by lateral flanks that are substantially perpendicular to the substrate.

The variation in resonant frequencies $f_{r(i)}$ may result from a variation, along the second axis of the array, in a width of the resonant cavities along the second axis of the array.

As a variant, the resonant cavities may be regions of one and the same stack formed of the reflectors and of the interlayer, the stack being covered by a thin layer that is opaque at the wavelength of the elementary light beams, the optical thin layer comprising through-openings defining an emission surface of the resonant cavities.

The resonant cavities may have a width $L_y$ along the second axis of the array and a length L along the first axis of the array, the length $L_x$ and the width $L_y$ being greater and smaller, respectively, than a lateral dimension $d_m$ of a resonant mode in a planar resonant cavity with infinite dimensions in the main plane, the lateral dimension $d_m$ being predefined according to a resonant wavelength of a reference resonant cavity of the array, the thickness and the refractive index of its intermediate layer, and the reflection coefficients of the two reflectors.

The resonant cavities may be produced on the basis of III-V semiconductor or dielectric compounds. In addition, the reflectors may be Bragg mirrors.

The interlayer of a central resonant cavity of the array may have a thickness equal to $k \times \lambda_{r(0)}/2n$, where k is an integer, $\lambda_{r(k)}$ is the resonant wavelength of the central resonant cavity, and n is the refractive index of the corresponding interlayer. A central resonant cavity is a resonant cavity located at the centre of the array.

The optoelectronic emitter may have a scanning angular velocity that is predefined according to a difference between the resonant frequencies of two adjacent resonant cavities, a resonant wavelength of a central resonant cavity of the array, and a pitch of the spatial arrangement of the resonant cavities along the second axis of the array.

The optoelectronic emitter may have a width of an angular sector scanned by the main light beam that is predefined according to a resonant wavelength of a central resonant cavity of the array and a width of the resonant cavities along the second axis of the array.

The optoelectronic emitter may have an angular width of the main light beam that is predefined according to the width of the angular sector and a total number of resonant cavities.

The optoelectronic emitter may have an angular sector scanning period that is predefined according to a difference between the resonant frequencies of two adjacent resonant cavities. In this case, the scanning period is the time between two successive instants when the light beam passes through $\theta=0°$. Specifically, the "main" light beam is defined at $t=0$ and $\theta=0°$. It scans the entire angular sector in a certain time. As it continues its scan of the angular sector, another light beam is generated at $\theta=0°$ and starts its scan. It then becomes the main light beam and the preceding light beam becomes the secondary light beam.

The invention also relates to a method for producing an optoelectronic emitter according to any one of the preceding features, in which the variation in resonant frequencies is brought about by a variation in the thickness of the interlayer of the resonant cavities along the second axis of the array, the method comprising a step of producing a stack intended to form the array of resonant cavities, the stack being produced in a reactor, on a turntable, starting from a position that is laterally offset with respect to an axis of rotation of the turntable in relation to a reference position for which the thickness of the interlayer exhibits a uniform thickness.

BRIEF DESCRIPTION OF THE DRAWINGS

Other aspects, aims, advantages and features of the invention will become more clearly apparent from reading the following detailed description of preferred embodiments thereof, this description being given by way of non-limiting example and with reference to the appended drawings, in which.

DETAILED DESCRIPTION OF PARTICULAR EMBODIMENTS

In the figures and in the remainder of the description, the same references have been used to designate identical or similar elements. In addition, the various elements are not shown to scale so as to improve the clarity of the figures. Moreover, the various embodiments and variants are not mutually exclusive and may be combined with one another. Unless indicated otherwise, the terms "substantially", "about" and "of the order of" mean to within 10%, and preferably to within 5%. Moreover, the terms "between . . . and . . . " and equivalents mean that the bounds are included, unless indicated otherwise.

The invention relates to an optoelectronic emitter allowing the emission of a main light beam exhibiting low angular divergence, in a predefined main direction in the far field which performs fast scanning of a given angular sector, in a very short time, for example of the order of a nanosecond or less. In other words, the optoelectronic emitter is designed to emit a light beam whose radiation pattern in the far field displays at least one intensity peak in a main direction which varies with time.

The expression "radiation pattern in the far field" refers to the angular distribution of the main light beam in the far field emitted by the optoelectronic emitter. This main light beam is formed by interference between the elementary light beams emitted by an array of resonant optical cavities. The radiation pattern in the far field of the optoelectronic emitter thus differs from the radiation patterns in near field of the resonant cavities (elementary emitters). The far field (Fraunhofer region) corresponds to a distance $D_{cl}$ greater than twice the ratio of the square of a large dimension L of the overall size of the optoelectronic emitter to the resonant wavelength $\lambda_r$ of a resonant cavity, in other words: $D_{cl} > 2 \times L^2/\lambda_r$.

Figure 1:
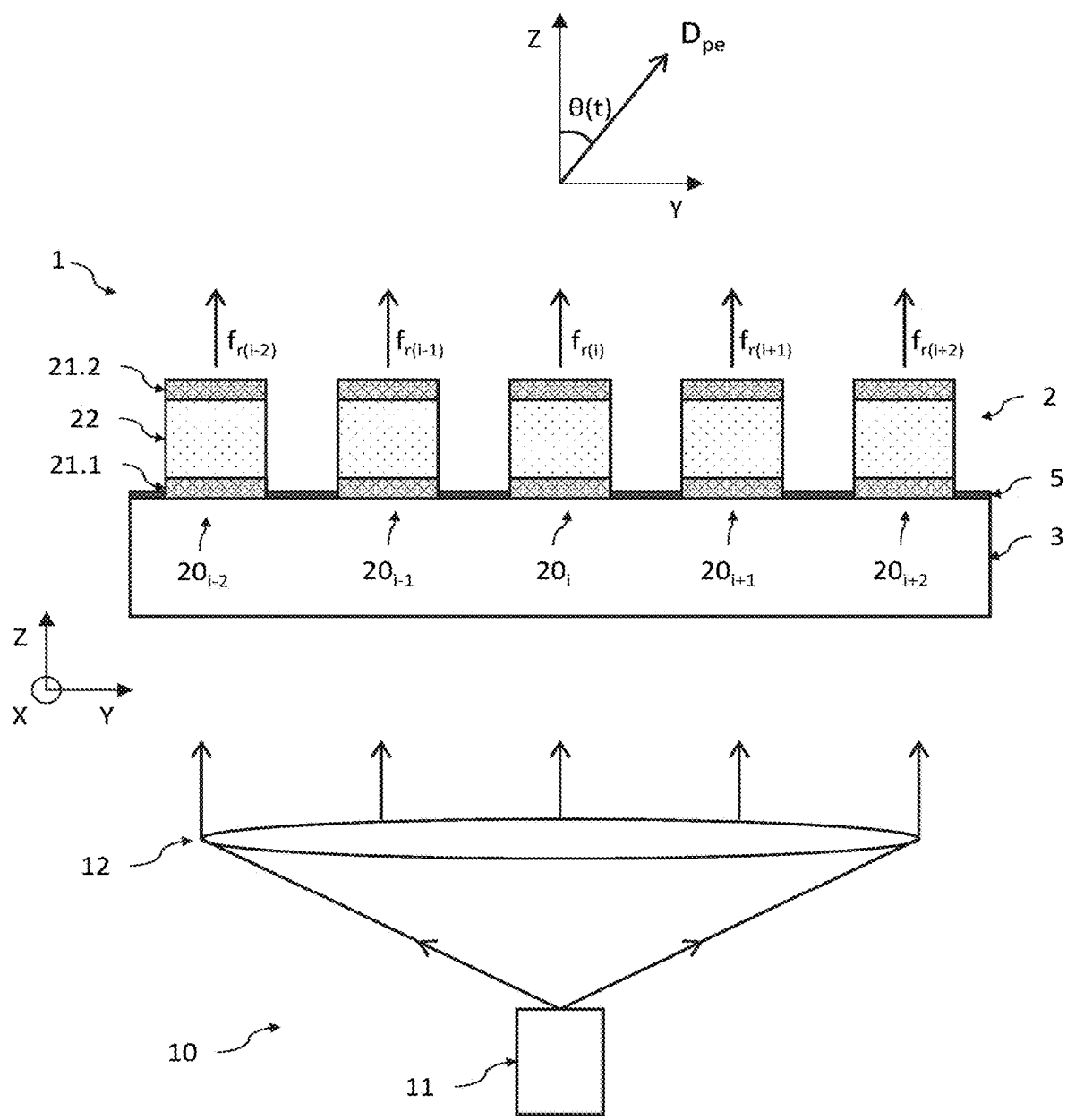
FIG. 1 is a schematic partial view, in cross section, of an optoelectronic emitter with angular scanning according to one embodiment.

FIG. 1 is a schematic partial view, in cross section, of an optoelectronic emitter 1 according to a first embodiment.

An orthogonal three-dimensional direct coordinate system XYZ, in which the X-axis and Y-axis form a plane parallel to the main plane of the substrate 3 on which rests an array 2 of resonant cavities $20_i$, and in which the Z-axis is oriented along the thickness of the resonant cavities $20_i$ and in the direction of emission of the resonant cavities $20_i$, is defined here and for the remainder of the description. In the remainder of the description, the terms "lower" and "upper" will be understood to relate to positions of increasing distance in the +Z-direction.

In general, the optoelectronic emitter 1 according to the invention comprises an array 2 of resonant optical cavities $20_i$ resting on a substrate 3. The resonant cavities $20_i$ are arranged parallel to one another and each extending longitudinally along a first axis of the array (here the X-axis).

They are referenced by the index i ranging from −M to M, with M≥1. The array comprises N cavities, where N is equal to 2M or 2M+1 depending on whether N is even or odd. Each resonant cavity $20_i$ is formed of a stack of two opposing reflectors 21.1, 21.2 and of an interlayer 22 located between the reflectors 21.1, 21.2, and having an emission face opposite the substrate 3. They are each designed to emit, via the emission face, in response to an optical excitation signal, what is referred to as an elementary light beam at a resonant frequency $f_{r(i)}$) specific to each resonant cavity $20_i$. In addition, they are configured to exhibit a variation, preferably a monotonic variation, in resonant frequencies $f_{r(i)}$ along a second axis of the array (here the Y-axis) perpendicular to the first, X-axis. The angular scanning of the optoelectronic emitter 1 then takes place in a plane perpendicular to that of the substrate 3 and containing the second, Y-axis.

An optical source 10 is designed to emit the optical excitation signal so as to illuminate and to excite all of the resonant cavities $20_i$ simultaneously. It should be noted that the resonant cavities $20_i$ in question here are the cavities that are intended to be illuminated and excited by the optical excitation signal. The array may comprise more resonant cavities than the N resonant cavities $20_i$ in question. The optical excitation signal is formed of laser pulses each having a spectral width $\Delta f_e$ centred on a central frequency $f_e$, the spectral width $\Delta f_e$ and the central frequency $f_e$ being predefined so as to cover the range of resonant frequencies $f_{r(i)}$.

Thus, the optical source 10 emits an optical excitation signal (pump light beam) which illuminates and excites all of the resonant cavities $20_i$ simultaneously. In response, the resonant cavities $20_i$ each emit an elementary light beam along the vertical, Z-axis (angle of inclination θ=0I. Because of the variation in the resonant frequency fro) from one resonant cavity $20_i$ to the next, a phase shift occurs between the elementary light beams. Thus, in the far field, a main light beam is formed by interference between the elementary light beams, which has an angle of inclination θ(t) with respect to the vertical, Z-axis which varies with time. The main light beam then scans a predefined angular sector in a short time, repetitively, as the intensity of the main light beam decreases.

The optical source 10 is thus designed to emit an optical excitation signal (pump light beam) allowing all of the resonant cavities $20_i$ to be illuminated and excited simultaneously. The optical excitation signal is a coherent signal, i.e. spatially and temporally coherent. Thus, the simultaneous excitation of the optical cavities $20_i$ by the coherent optical excitation signal brings about the emission of the elementary light beams, which will then be able to interfere with one another to form, in the far field, the main light beam.

In addition, the optical excitation signal takes the form of laser pulses of spectral width $\Delta f_e$ centred on a central frequency $f_e$. The duration of each laser pulse ($\Delta t_e \sim 1/\Delta f_e$) may be of the order of a femtosecond to a nanosecond. In a known manner, the duration of a laser pulse is defined as the full width at half-maximum (FWHM) of the change in the optical power of the laser as a function of time.

Lastly, the duration $\Delta t_e$ of each pulsed optical excitation signal, i.e. of each laser pulse, is shorter than the light storage time $\tau_i$ of each resonant cavity $20_i$: $\Delta t_e < \tau_i$, and preferably is at least 10 times shorter than the storage time $\tau_i$. As described in detail further on, the storage time $\tau_i$ is dependent on the quality factor Q and on the resonant wavelength $\lambda_{r(i)}$ of the cavity $20_i$: $\tau_i = Q \times \lambda_{r(i)}/(2\pi \times c)$, where c is the speed of light in vacuum. Furthermore, the quality factor Q is defined by relationship (2) given further on. The duration $\Delta t_e$ of the laser pulses being shorter than the storage times $\tau_i$ of the resonant cavities $20_i$ means that in operation, the laser pulse injects light into the resonant cavities $20_i$ simultaneously, and then the cavities $20_i$ re-emit the light in the form of the elementary light beams which subsequently interfere in the far field to form the main light beam (which performs the angular scanning).

The spectral width $\Delta f_e$ and the central frequency $f_e$ are predefined so as to cover the range of resonant frequencies $f_{r(i)}$, i.e. the illumination of the resonant cavities $20_i$ is an injection of light into the resonant cavities $20_i$ and therefore excitation thereof. For that, the central frequency $f_e$ is preferably chosen to be equal to the mean of the resonant frequencies $f_r$ of the resonant cavities $20_i$, in other words: $f_e = moy(f_{r(i)})_{i=-M,M}$. In addition, the spectral width $\Delta f_e$ is at least equal to the width $G_r = |f_{r(M)} - f_{r(-M)}|$ of the range of resonant frequencies of the resonant cavities $20_i$, i.e. at least equal to $2M \times \Delta$ where $\Delta$ is the difference between the resonant frequencies $f_{r(i)}$, $f_{r(i=1)}$ of adjacent resonant cavities. Preferably, the spectral width $\Delta f_e$ is between $G_r$ and $3 \times G_r$. Thus, the duration $\Delta t_e$ of the laser pulses is shorter than or equal to the inverse of $2M \times \Delta$: $\Delta t_e \leq 1/(2M \times \Delta)$.

As a result, the laser source is therefore configured so that the duration $\Delta t_e$ of the laser pulses satisfies two conditions, namely: $\Delta t_e < \tau_i$ on the one hand, and $\Delta t_e \leq 1/(2M \times \Delta)$ on the other hand. According to the numerical examples given further on, $\tau_i$ may be equal to 200 ps, such that the first condition gives: $\Delta t_e < 200$ ps and preferably $\Delta t_e < 20$ ps. Furthermore, $2M \times \Delta$ may be equal to 90 GHz, such that the second condition is more restrictive: $\Delta t_e \leq 11$ ps, and allows the first condition to be satisfied de facto.

It should additionally be noted that it is preferred for the main light beam to scan the angular sector once per laser pulse, which means that the storage time $\tau_i$ is equal to $1/\Delta$. Specifically, as indicated further on, the scanning period $T_0$ (time between two successive instants when the main beam passes through)θ=0° is equal to $1/\Delta$. Thus, the second condition $\Delta t_e \leq 1/(2M \times \Delta)$ becomes $\Delta t_e < \tau_i/2M$, which automatically satisfies the condition $\Delta t_e < \tau_i$.

In this example, the optical source 10 comprises a laser source 11, for example, in the case of emission in the near-infrared (between 0.7 and 2 μm), a vertical-cavity surface emitting laser (VCSEL), or an edge-emitting laser (EEL). It should be noted that the optical source 10 may be produced in a monolithic manner with the structure formed of the substrate 3 and of the array 2 of resonant cavities $20_i$, or may be an element distinct from this structure and coupled thereto by an optical system.

The optical source 10 may also comprise optical elements for shaping the optical excitation signal emitted by the laser source 11, for example here a beam expander associated with a collimating lens 12. Thus, the lateral dimension of the optical excitation signal is widened so as to simultaneously illuminate all of the resonant cavities $20_i$. In addition, the optical source 10 may comprise an optical element designed to make the angular distribution of the intensity of the pump light beam constant, to obtain a flat intensity profile, rather than a Gaussian profile. Of course, these various optical elements may be distinct or combined. In this example, a collimating lens 12 is shown (free-space optics configuration), but this lens and these various optical elements may have a guided-optics configuration, and be, for example, an array of diffraction gratings, integrated on a substrate and optically coupled to the laser source 11.

In this example, the optical excitation signal is emitted in the direction of the array 2 of resonant cavities $20_i$ through the substrate 3, which is then transparent at the wavelength $\lambda_e$ of the optical excitation signal. The optical excitation signal is preferably oriented orthogonally to the substrate 3 (along the Z-axis). As a variant, it may be inclined with respect thereto but contained in a plane orthogonal to the first, X-axis of the array of the resonant cavities $20_i$ such that each resonant cavity is illuminated uniformly over its entire length. It may also be inclined but contained in a plane orthogonal to the second, Y-axis of the array of the resonant cavities $20_i$, which results in a change in the emission angle of each elementary beam and therefore in the plane in which the far-field scanning occurs.

In the case of back-face illumination, an antireflection layer (not shown) may be arranged on the back face of the substrate 3, or between the substrate 3 and the resonant cavities $20_i$, and the reflectivities of the reflectors 21.1 and 21.2 are preferably identical. As a variant, the resonant cavities $20_i$ may be illuminated on the front face by the optical excitation signal, the front face of the substrate 3 being that on which the resonant cavities $20_i$ rest. In this case, the optical excitation signal is inclined with respect to the Z-axis and may be contained in the XZ-plane. The reflector 21.1 may then have a very high reflectivity such that the resonant cavities $20_i$ radiate only from one side (that of the +Z-direction). In this variant, the resonant cavities $20_i$ preferably have the structured configuration described further on with reference to FIG. 2A, such that the resonant mode in each resonant cavity $20_i$ is well defined laterally and is guided vertically.

The optoelectronic emitter 1 comprises an array 2 of resonant cavities $20_i$, resting on a substrate 3. They extend longitudinally along the first, X-axis of the array, and are arranged parallel to one another in the XY-plane. What is meant by "parallel" is that the resonant cavities $20_i$ extend longitudinally in the XY-plane and have a relative inclination of zero, between two adjacent resonant cavities, or smaller than a few degrees. The resonant cavities $20_i$ are designed each to emit, in response to the optical excitation signal, an elementary light beam at a resonant frequency $f_{r(i)}$, and are configured such that they exhibit a variation in the resonant frequency $f_{r(i)}$ from one resonant cavity $20_i$ to the next, along the second, Y-axis of the array, this second, Y-axis being contained in the XY-plane and perpendicular to the first, X-axis.

The resonant cavities $20_i$ are Fabry-Perot optical cavities, and are each formed of at least one interlayer 22 located between two reflectors 21.1, 21.2, here two Bragg mirrors, resting on the substrate 3. They have a main face of emission of the elementary light beam, this emission face being opposite the substrate 3.

The substrate 3 is a carrier on which rests the array 2 of resonant cavities $20_i$. It is formed of a thick, preferably rigid main layer made of one or more materials. The main layer may be a semiconductor wafer having, for example, a thickness of one to several hundred microns. They may be made here of a crystalline semiconductor compound, for example here of GaAs. In this example in which the optical excitation signal is transmitted through the substrate 3, it is made of a material that is transparent at the excitation wavelength. In other words, the material of the substrate 3 has a level of transmission at the excitation wavelength that is at least equal to 50%, preferably at least equal to 90%, or even more. In the case of back-face illumination, an antireflection layer (not shown) may be arranged beneath the resonant cavities.

The Bragg mirrors 21.1, 21.2 are preferably identical from one resonant cavity $20_i$ to the next, in terms of composition and thickness. They may be formed of an alternation of quarter-wave dielectric or semiconductor layers having, respectively, a high refractive index and a low refractive index. The quarter-wave layers may be made, purely by way of illustration, from GaAs and AlAs semiconductor compounds, and alloys thereof. The semiconductor compounds may be amorphous or crystalline. They may also be made, for example, from $SiO_2$ and from $TiO_2$.

The interlayer 22 is made of a material that is non-absorbent at the wavelength of the elementary light beam emitted by the corresponding resonant cavity $20_i$. In other words, the interlayer 22 exhibits very low absorption at this wavelength, such that the losses brought about in the interlayer 22 are negligible with respect to the intrinsic losses of the resonant cavity $20_i$ due in particular to the transmission of the reflectors 21.1 and 21.2. The material of the interlayer 22 may be a dielectric material, for example an $SiO_2/TiO_2$ stack, or a crystalline semiconductor material, for example a IV, III-V or II-VI semiconductor material. By way of example, the interlayer 22 may be made of GaAs. The interlayer 22 may be made of one and the same material (and therefore be a single layer), or be formed of a stack of different materials. Furthermore, it has a refractive index $n_{(i)}$ and a thickness $e_{(i)}$ along the Z-axis. In the case that the interlayer 22 is made of a plurality of materials (without an interface with a substantial change in index), the refractive index $n_{(i)}$ may be an average index defined by a mean (e.g. arithmetic mean) of the indices of the various layers weighted by their thicknesses.

The thickness $e_{(i)}$ is preferably constant along the first, X-axis of the array (along the length $L_x$, in the case that the resonant cavities are semi-infinite). It may vary along the second, Y-axis of the array, as described further on. The thickness $e_{(i)}$ is chosen to be around $k \times \lambda_{r(0)}/2n$, where k is an integer, $\lambda_{r(0)}$ is the wavelength of a resonant cavity $20_i$ of rank i=0 (central cavity located at the centre of the array), and n is the refractive index of the interlayer 22. As indicated further on, the integer k is preferably chosen to be equal to several tens, for example equal to about 30, or to about 60 or 70, in order to increase the quality factor of the resonant cavities $20_i$.

Each resonant cavity $20_i$ has longitudinal and transverse dimensions in the XY-plane, here a length $L_x$ along the first, X-axis of the array, and a width $L_y$ along the second, Y-axis of the array, and a thickness $e_{(i)}$ along the Z-axis. The length $L_x$ and width $L_y$ are preferably identical from one resonant cavity $20_i$ to the next.

Figure 2A:
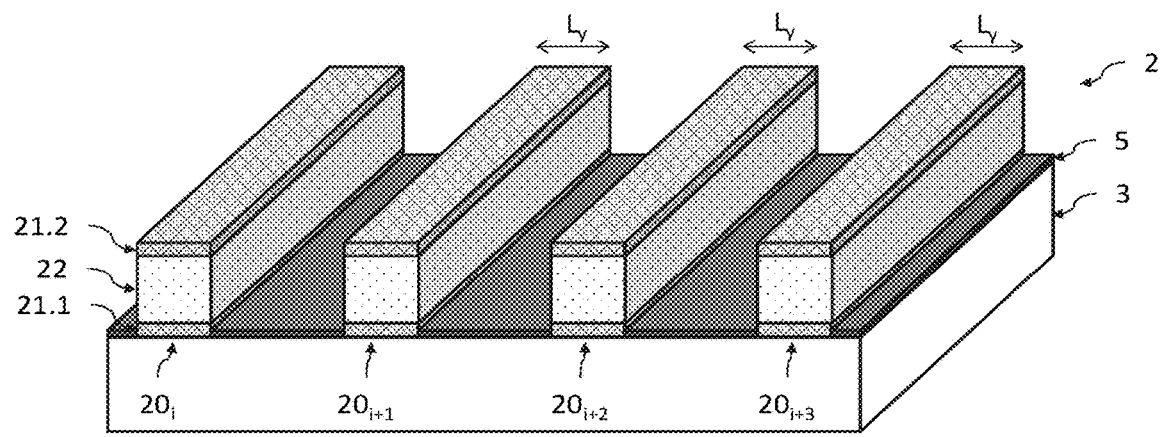
FIGS. 2A and 2B are schematic and partial perspective views of two different configurations of the array of resonant cavities of the optoelectronic emitter according to one embodiment, i.e. in a structured configuration (FIG. 2A) and in an unstructured, planar configuration (FIG. 2B)
Figure 2B:
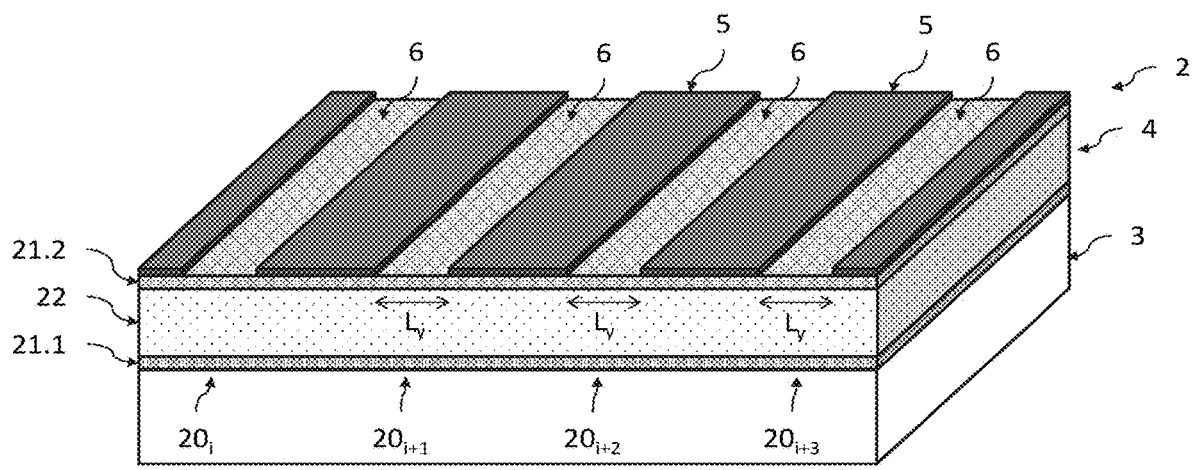

As shown in FIGS. 2A and 2B, the array 2 of resonant cavities $20_i$ is preferably a one-dimensional array in the sense that the length $L_x$ is much greater than the width $L_y$ (semi-infinite resonant cavities $20_i$). As a variant (not shown), the array may be two-dimensional in the sense that the resonant cavities $20_i$ are arranged with respect to one another along the X- and Y-axes.

The length $L_x$ and width $L_y$ are predefined as a function of a lateral dimension $d_m$ of a resonant mode of a planar Fabry-Pérot cavity (i.e. infinite dimensions in the XY-plane). More precisely, the width $L_y$ is smaller than this lateral dimension $d_m$, and the length $L_x$ is here greater than this lateral dimension $d_m$, or at least equal to $5 \times d_m$, or at least equal to $10 \times d_m$, or more, and greater than the thickness $e_{e(i)}$, or at least equal to $5 \times e_{(i)}$, or at least equal to $10 \times e_{(i)}$ or more. In the case of a two-dimensional array, the length $L_x$ would then also be smaller than the lateral dimension $d_m$.

The lateral dimension $d_m$ of the resonant mode in a planar Fabry-Perot optical cavity (of infinite dimensions in the XY-plane) is dependent on the reflection coefficients $R_1$ and $R_2$ of the reflectors, on the thickness e, on the refractive index n of the interlayer 22, and on the resonant wavelength $\lambda_r$ (with $\lambda_r = c/f_r$, with c the speed of light in vacuum). Here, the thickness e and the wavelength $\lambda_r$ may correspond to those of a reference resonant cavity $20_i$, of the array, for example of the central cavity $20_{i=0}$. The lateral dimension $d_m$ may be determined from the expression given in the document by Benisty et al entitled Impact of Planar Microcavity Effects on Light Extraction—Part I: Basic Concepts and Analytical Trends, IEEE J. Quantum Electron. Vol. 34, pp. 1612-1631, 1998:

$$d_m = \sqrt{\frac{\pi \lambda_r e}{2n} \frac{1}{1 - \frac{R_1 + R_2}{2}}} \quad (1)$$

Thus, the resonant mode supported by each resonant cavity $20_i$ is here confined mainly along the second, Y-axis of the array and not along the first, X-axis (the resonant cavities $20_i$ are said to be one-dimensional).

Furthermore, so that the resonant frequencies $f_{r(i)}$ vary monotonically from one resonant cavity $20_i$ to the next, the resonant cavities $20_i$ exhibit a variation in one and the same physical property of interest, this physical property being a property of the resonant cavities $20_i$ that participates in defining the resonant frequency $f_r$. The property of interest may be chosen from among the thickness e and/or the refractive index n of the interlayer 22, and/or the width $L_y$ of the resonant cavity $20_i$.

In the example of FIG. 1, the physical property of interest is the thickness $e_{(i)}$ of the resonant cavities $20_i$. The thickness $e_{(i)}$ varies from one resonant cavity $20_i$ to the next, continuously or in steps. In other words, in the case of a continuous variation, the thickness $e_{(i)}$ may vary with a gradient $\nabla_y e_{(i)}$ along the second, Y-axis of the array, which may be constant. Thus, the thickness e(y) varies within each resonant cavity $20_i$ along the second, Y-axis of the array. In this case, it is considered that the thickness $e_{(i)}$ associated with the resonant cavity $20_i$ of index i is the mean value of its thickness e(y). Of course, other definitions of the thickness $e_{(i)}$ are possible, such as, for example, the minimum or maximum value of the thickness e(y) in the resonant cavity in question. Furthermore, in the case of a variation in steps, the thickness e(y) may have a constant value along the second, Y-axis of the array within a resonant cavity, this constant value varying from one resonant cavity $20_i$ to the next.

The variation in the physical property of interest of the resonant cavities $20_i$, for example here in the thickness $e_{(i)}$, is a preferably monotonic variation, for example increasing or strictly increasing. Furthermore, the relative difference in the physical property of interest, here the thickness $e_{(i)}$, between two adjacent resonant cavities $20_i$ i and i+1 is small, inasmuch as the desired relative difference in resonant frequency $f_{r(i)}$ from one resonant cavity $20_i$ to the next is small, for example of the order of 1% or less, for example smaller than or equal to 0.1%, or 0.01%, or even 0.005%. By way of example, the difference Δ between the resonant frequencies $f_{r(0)}$, $f_{r(1)}$ of two adjacent resonant cavities $20_i$ of rank 0 and 1 may be equal to 5 GHz, and the resonant frequency $f_{r(0)}$ may be equal to $3 \times 10^5$ GHz, which leads to a relative difference $\Delta/f_{r(0)}$ smaller than 0.002%. In the case that the physical property of interest is the thickness $e_{(i)}$ of the interlayer 22, and that it varies within each resonant cavity $20_i$ along the second, Y-axis of the array, the relative difference is small enough for the two Bragg mirrors 21.1, 21.2 to be considered parallel to one another.

FIG. 2A is a schematic and partial perspective view of an array 2 of resonant cavities $20_i$ resting on a substrate 3, according to a first variant embodiment, in which the array has a "structured" configuration. Specifically, the resonant cavities $20_i$ have been obtained by locally etching an initial layer, and form pads that are distinct from one another in the XY-plane. In this example, the resonant cavities $20_i$ exhibit a variation in the thickness of the interlayer 22 along the second, Y-axis of the array. However, for the sake of clarity, this variation in thickness is not shown.

In this structured configuration, the resonant cavities $20_i$ are pads that are distinct from one another, i.e. they are physically separate in the XY-plane. Each resonant cavity $20_i$ has a lateral flank that is oriented substantially vertically, such that the Bragg mirrors 21.1, 21.2 and the interlayer 22 have the same length $L_x$ and width $L_y$. The interlayer 22 here has a thickness e(x,y) which is constant along the first, X-axis, and which varies along the second, Y-axis of the array. The interlayers 22 have been obtained by locally etching an initial layer. The thickness e(x,y) of this initial layer is constant along the first, X-axis of the array, and has a constant gradient $\nabla_y e(x,y)$ along the second, Y-axis.

The resonant cavities $20_i$ are arranged spatially along the second, Y-axis of the array, periodically, with a pitch P. By way of example, the resonant cavities $20_i$ have a width $L_y$ equal to about 20 µm and are arranged with a pitch P equal to about 40 It should be noted that, generally, the arrangement of the resonant cavities $20_i$ may be periodic or non-periodic.

In this example, given that the optical excitation signal is transmitted by the substrate 3 along the +Z-direction, the surface of the substrate 3 located between the resonant cavities $20_i$ is coated with a thin layer 5 that is opaque to the optical excitation signal. What is meant by "opaque" is that the thin layer is made of a material that is absorbent or reflective at the wavelength of the laser pulses. By way of example, the opaque thin layer 5 may be made of gold.

The resonant cavities $20_i$ here have a very high quality factor Q, for example of the order of 100000 or more, which is preferably substantially identical from one resonant cavity 20 to the next. Thus, the radiation pattern in the far field of each resonant cavity $20_i$ is very narrow around the direction of emission (here the Z-axis) of the elementary light beam. The quality factor Q may be determined from the following relationship (or equivalent to within the multiplier coefficient):

$$Q = \frac{2ne_i}{\lambda_{r(i)}} \frac{4\pi}{(2 - R_1 - R_2)} \quad (2)$$

Furthermore, the storage time t of light in the resonant cavity $20_i$ is proportional to the quality factor Q. It expresses the fact that the light energy E(t) stored in a resonant CAVITY 20; decreases exponentially as $e^{-t/\tau}$. Thus, a quality factor Q of the order of 100000 corresponds to a storage time τ of the order of a few tens or hundreds of picoseconds. The storage time τ is proportional to the quality factor Q via the following relationship (or equivalent to within the multiplier coefficient):

$$\tau_i = Q \frac{\lambda_{r(i)}}{2\pi c} = \frac{4}{c} \frac{ne_i}{(2 - R_1 - R_2)} \quad (3)$$

FIG. 2B is a schematic and partial perspective view of an array 2 of resonant cavities $20_i$ resting on the substrate 3, according to a second variant embodiment, in which the array has an unstructured, two-dimensional planar configuration.

The array 2 of resonant cavities $20_i$ differs here from that illustrated in FIG. 2A in that the resonant cavities $20_i$ are distinct regions of an unstructured stack 4. In other words, a continuous stack 4, i.e. one that is unstructured by local etching, comprises the two Bragg mirrors 21.1, 21.2 and the interlayer 22. The planar stack 4 may have a length equal to L along the first, X-axis and a width $L_y$ along the second, Y-axis of the order of P×N. An opaque thin layer 5 partially covers the upper Bragg mirror 21.2, and comprises through-openings 6 which delimit the resonant cavities $20_i$ in the XY-plane.

In other words, the through-openings 6 have a length $L_x$ and a width $L_y$. They are arranged here periodically with pitch P along the second, Y-axis of the array. The through-openings 6 define the resonant cavities $20_i$. The variation in resonant frequency $f_{r(i)}$ is caused by a variation in a physical property of interest along the second, Y-axis of the array, this physical property of interest possibly being, for example, the thickness e(y) and/or the refractive index n(y) of the interlayer 22.

Figure 3A:
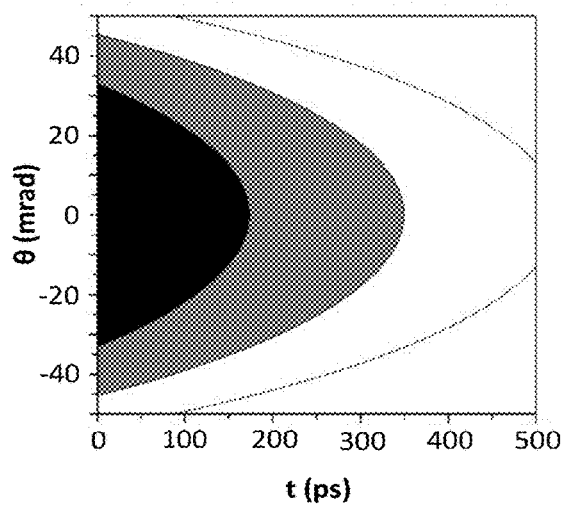
FIGS. 3A to 3C are examples of the change with time in the radiation pattern in the far field of one or more resonant cavities in the structured configuration (see FIG. 2A), for a single resonant cavity (FIG. 3A), for an array of resonant cavities without variation in the resonant frequency from one resonant cavity to the next (FIG. 3B), and for an array of resonant cavities with variation in the resonant frequency from one resonant cavity to the next (FIG. 3C)
Figure 3B:
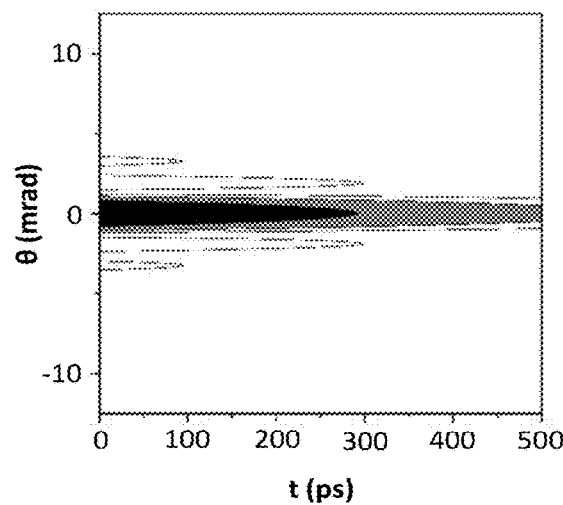
Figure 3C:
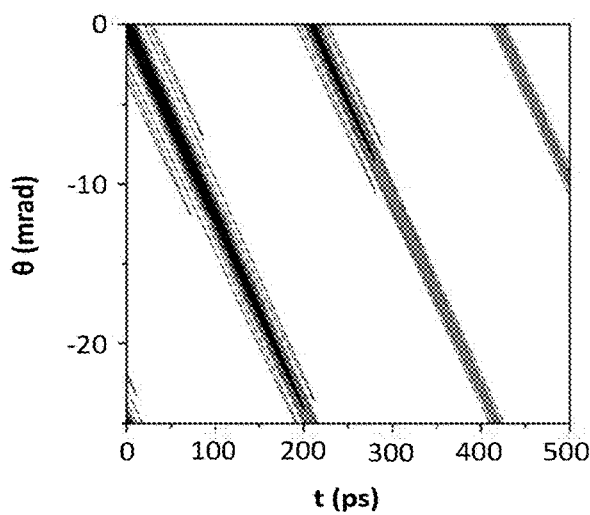

FIGS. 3A to 3C illustrate various examples of the change with time in the radiation pattern in the far field of the optoelectronic emitter 1 in the structured configuration (see FIG. 2A), for a single resonant cavity (FIG. 3A), for an array 2 of resonant cavities 20 without variation in resonant frequencies (FIG. 3B), and for an array 2 of resonant cavities $20_i$ with variation in resonant frequencies (FIG. 3C). The optical intensity is shown on a logarithmic scale, and the width of each greyscale level corresponds to a factor of five.

It is possible to define an expression for the intensity of the light beam in the far field for a single resonant cavity, as a function of the angle of inclination θ, in the case that the optical excitation signal has a uniform intensity profile. In this case, the light is injected into the resonant cavity mainly in the fundamental transverse mode. By taking account of the optical field as $\cos(\pi y/L_y)$ of this transverse mode, it is thus possible to give the intensity of the light beam in the far field as a function of the angle of inclination θ with respect to the Z-axis, emitted by the single resonant cavity:

$$I_i(t, \theta) \propto e^{-t/\tau} \frac{4e_i^2}{\pi^2} \frac{\cos^{2\pi e_i \theta / \lambda_{r(i)}}}{\left(1 - (2e_i \theta / \lambda_{r(i)})^2\right)^2} \quad (4)$$

Next, by summing the amplitude of the elementary light beam by each of the resonant cavities $20_i$ it is possible to describe the change with time as a function of the angle of inclination θ of the intensity of the main light beam emitted by the optoelectronic emitter 1 in the far field, using the following expression:

$$I_p(t, \theta) = I_0(t, \theta) \frac{\sin^2((2M+1)\eta/2)}{\sin^2(\eta/2)} \quad (5)$$

$$\eta = 2\pi(\Delta \times t + P\theta/\lambda_{r(0)}) \quad (6)$$

where $\lambda_{r(0)}$ is the resonant wavelength of the resonant cavity located substantially at the centre of the array (rank i=0).

FIG. 3A illustrates an example of the change with time in the radiation pattern in the far field for a single resonant cavity. In this example, the resonant cavity is semi-infinite (length $L_x$ large with respect to the lateral dimension $d_m$ of the resonant mode) along the second, Y-axis of the array. The width $L_y$ is equal to 20 µm. A laser pulse is received at time t=0, and, in response, the resonant cavity emits an elementary light beam at the resonant frequency $f_r=3\times10^{14}$ Hz (wavelength $\lambda_r=1$ µm). The storage time τ is here equal to about 200 ps.

It is noted that the intensity of the elementary light beam in the far field decreases exponentially over time. Furthermore, the angular distribution does not change overtime: the main direction of emission $D_{pe}$ of the light beam stays oriented in the +Z-direction. Thus, the angle of inclination θ(t) is stationary and remains equal to zero.

FIG. 3B illustrates an example of the change with time in the radiation pattern in the far field for an array 2 of resonant cavities $20_i$ exhibiting no variation in the resonant frequencies (these are equal from one resonant cavity $20_i$ to the next). The resonant cavities $20_i$ have the same characteristics as those described with reference to FIG. 3A. They are arranged periodically along the second, Y-axis of the array with a pitch P equal to 40 µm. In this example, M is equal to 9, such that the array comprises 19 resonant cavities (N=2×M+1=19). In the far field, the main light beam is formed by interference between the elementary light beams.

It is noted that the main light beam has an angular distribution that is more peaked, i.e. narrower, around the main axis of emission $D_{pe}$. This decrease in the divergence of the emission cone of the main light beam is due to the placing of the resonant cavities $20_i$ in an array and to the interference between the elementary light beams. Furthermore, here too, the angular distribution does not change over time: the main direction of emission $D_{pe}$ of the light beam stays oriented in the +Z-direction. Thus, the angle of inclination θ(t) is stationary and remains equal to zero.

It should be noted here that the radiation pattern of the main light beam, in which the intensity exhibits a peak for a zero value of the angle of inclination θ=0, is here representative of an array comprising an odd number of resonant cavities $20_i$. In the case of an even number of resonant cavities $20_i$, the main light beam exhibits two intensity peaks located on either side of the angle of inclination θ=0.

FIG. 3C illustrates an example of the change with time in the radiation pattern in the far field for an array 2 of resonant cavities $20_i$. The resonant cavities $20_i$ have the same characteristics as those described with reference to FIG. 3B, besides the fact that the resonant frequencies $f_{r(i)}$ exhibit a monotonic variation from one resonant cavity $20_i$ to the next, with a constant difference Δ equal to $5\times10^9$ Hz.

It is noted that the main light beam also has an angular distribution that is very peaked around the main direction of emission $D_{pe}$. However, unlike the example of FIG. 3B, the main direction of emission $D_{pe}$ is no longer stationary and oriented in the +Z-direction, but varies linearly as a function of time. Thus, the angle of inclination θ(t) varies between a zero value and a maximum value, here 25 mrad, in a time equal to about 200 ps. The angular sector is scanned multiple times, with the optical intensity decreasing as a function of time.

Figure 4A:
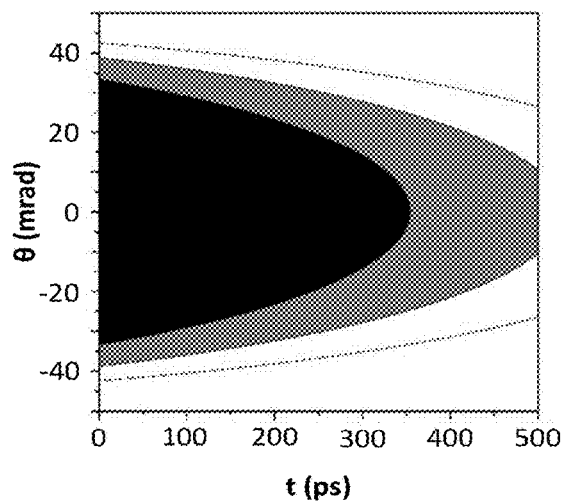
FIGS. 4A to 4C are examples of the change with time in the radiation pattern in the far field of one or more resonant cavities in the unstructured, planar configuration (see FIG. 2B), for a single resonant cavity (FIG. 4A), for an array of resonant cavities without variation in the resonant frequency from one resonant cavity to the next (FIG. 4B), and for an array of resonant cavities with variation in the resonant frequency from one resonant cavity to the next (FIG. 4C)
Figure 4B:
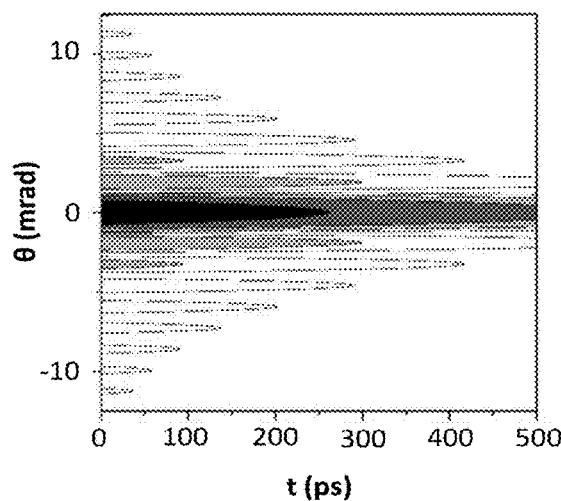
Figure 4C:
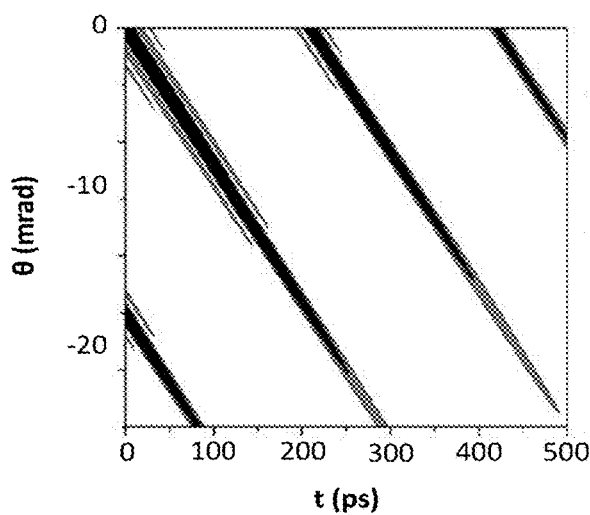

FIGS. 4A to 4C illustrate various examples of the change with time in the radiation pattern in the far field of the optoelectronic emitter 1 in the unstructured, planar configuration (see FIG. 2B), for a single resonant cavity (FIG. 4A), for an array 2 of resonant cavities $20_i$ without variation in resonant frequencies (FIG. 4B), and for an array 2 of resonant cavities $20_i$ with a variation in resonant frequencies (FIG. 4C). Here too, the optical intensity is shown on a logarithmic scale and the width of each greyscale level corresponds to a factor of five.

It is possible to define an expression for the intensity of the light beam in the far field as a function of the angle of inclination θ for a single resonant cavity, in the case that the optical excitation signal has a uniform intensity profile. In this case, unlike the configuration of FIG. 2A, the resonant cavity is dimensioned by the through-opening 6 in the opaque thin layer 5 located on its emission face, rather than by a physical border of a pad resting on the substrate 3. Because the optical excitation signal injects a uniform field into the plane of the cavity, it is possible to express the change with time in the intensity of the light beam in the far field as a function of the angle of inclination θ with respect to the Z-axis, emitted by the resonant single cavity in the following way:

$$I_i(t, \theta) \propto e^{-t/\tau} e_i^2 \frac{\sin^{2\pi e_i \theta / \lambda_{r(i)}}}{(2e_i \theta / \lambda_{r(i)})^2} \quad (7)$$

It is then possible, like above, to describe the change with time in the intensity $I_p(t,\theta)$ of the main light beam emitted by the optoelectronic emitter 1 in the far field, as a function of the angle of inclination θ formed by the main direction of emission $D_{pe}$ with respect to the vertical, Z-axis in the YZ-plane.

FIG. 4A illustrates an example of the change with time in the radiation pattern in the far field for a single resonant cavity $20_i$. In this example, the resonant cavity $20_i$ is formed within the planar stack 4. The upper Bragg mirror 21.2 is coated with an opaque thin layer 5, which has a through-opening 6 (slot) with a width $L_y$ of 20 µm and a length $L_x$ greater than the lateral dimension $d_m$. A laser pulse is received at time t=0, and, in response, the resonant cavity emits an elementary light beam at the resonant frequency $f_r=3\times10^{14}$ Hz (wavelength $\lambda_r=1$ µm). The storage time τ is here equal to about 200 ps.

The change with time in the intensity of the elementary light beam in the far field is similar to that of FIG. 3A. The main direction of emission $D_{pe}$ of the light beam also here stays substantially oriented in the +Z-direction: the angle of inclination θ(t) is stationary and remains equal to zero. The optical intensity decreases exponentially as a function of time.

FIG. 4B illustrates an example of the change with time in the radiation pattern in the far field of the main light beam formed by an array 2 of resonant cavities $20_i$ which exhibits no variation in the resonant frequencies (frequencies $f_{r(i)}$ equal to one another). The resonant cavities $20_i$ have the same characteristics as those described with reference to FIG. 4A, except that they are defined by through-openings 6 made in the opaque thin layer 5. The openings have a width $L_y$ of 20 µm, and a length L greater than the lateral dimension $d_m$. They are arranged periodically, along the second, Y-axis of the array, with a pitch P of 40 µm. In this example, M is equal to 9, such that the array comprises 19 resonant cavities. In the far field, the main light beam is formed by interference between the elementary light beams.

The main light beam exhibits an angular distribution with a peak centred on the main direction of emission $D_{pe}$. The angular distribution does not change over time: the main direction of emission $D_{pe}$ of the light beam stays oriented in the +Z-direction. Thus, the angle of inclination θ(t) is stationary and remains equal to zero.

FIG. 4C illustrates an example of the change with time in the radiation pattern in the far field for an array 2 of resonant cavities $20_i$. The resonant cavities $20_i$ have the same characteristics as those described with reference to FIG. 4B, besides the fact that the resonant frequencies $f_{r(i)}$ exhibit a monotonic variation from one resonant cavity 20 to the next, with a constant difference Δ equal to $5\times10^9$ Hz.

It is noted that the main light beam also has an angular distribution that is very peaked around the main direction of emission $D_{pe}$. However, unlike the example of FIG. 4B, the main direction of emission $D_{pe}$ is no longer stationary and oriented in the +Z-direction, but varies linearly as a function of time. Thus, the angle of inclination θ(t) varies between a zero value and a maximum value, here 25 mrad, in a time equal to about 200 ps. The angular sector is scanned multiple times, with the optical intensity decreasing as a function of time.

Thus, the optoelectronic emitter 1 is designed to emit a light beam that performs very fast scanning of an angular sector in the far field. The angular sector may be of the order of a few tens of milliradians, and the scanning time (rate) may be shorter than a nanosecond. The main light beam exhibits low angular divergence around the main direction of emission $D_{pe}$.

The angular scanning is obtained through the monotonic variation in the resonant frequency of the resonant cavities $20_i$, and does not require the use of a mechanical device to perform this angular scanning. It also does not require the use of phase shifters to apply a relative phase between the optical signals illuminating the various resonant cavities $20_i$. It thus differs from optical-phased-array optoelectronic transmitters in that the optical excitation signal is identical for all of the resonant cavities $20_i$, and in that the resonant cavities $20_i$ exhibit a variation in a physical property of interest, this variation being behind the spatial variation in the resonant frequencies and manifesting as the appearance of a relative phase between the elementary light beams during their propagation through free space. Conversely, in the case of optical-phased-array optoelectronic transmitters, each optical antenna receives an optical excitation signal that is different from that of the adjacent optical antenna (phase shift). In addition, the optical antennas all have the same physical properties.

It should be noted that the optoelectronic emitter 1 according to the invention may exhibit a linear or non-linear monotonic variation in the resonant frequencies from one resonant cavity $20_i$ to the next. Furthermore, the resonant cavities $20_i$ may be arranged periodically or non-periodically along the second, Y-axis of the array. Lastly, the resonant cavities $20_i$ may have a width $L_y$ that is identical or non-identical from one resonant cavity $20_i$ to the next. Whatever the case, these various adjustments in the characteristics of the array of resonant cavities also lead to the interference between the elementary light beams (oriented along the vertical, Z-axis) causing the formation of a main light beam in the far field that has an inclination θ(t) that varies with time. The distribution g of the angular variation θ=g(t) may vary according to the various adjustments mentioned above.

It should also be noted that the characteristics of the angular scan may be adjusted according to a set of parameters. These parameters may be the number M (or the total number N of resonant cavities $20_i$), the width $L_y$, the pitch P, the storage time τ (or the quality factor Q), and the difference Δ between the resonant frequencies $f_{r(i)}$ of adjacent resonant cavities $20_i$. Specifically, it appears that the following characteristics may be expressed as a function of these parameters via the relationships:

The angular velocity dθ/dt of scanning: $dθ/dt = \lambda_{r(0)} \Delta/P$.

The size $L_θ$ of the scanned angular sector: $L_θ = \pm 0.6 \times \lambda_{r(0)}/L_y$ in the case of resonant cavities $20_i$ in the structured configuration (see FIG. 2A), or: $L_θ = \pm 0.44 \times \lambda_{r(0)}/L_y$ in the case of resonant cavities $20_i$ in the unstructured, planar configuration (see FIG. 2B).

The angular width δθ of the main light beam: $δθ = L_θ/N = 3\lambda_{r(0)}/4NL_y$.

The scanning period $T_θ$ of the angular sector (time between two successive instants when the main light beam passes through θ=0°): $T_θ = 1/\Delta$.

It is then possible to adjust this or that characteristic of the angular scan according to the parameters in question.

The method for producing an optoelectronic emitter 1 according to the invention depends in particular on the choice of physical property of interest (thickness and/or refractive index of the interlayer 22, width of the resonant cavities $20_i$) to be varied to obtain the spatial variation in the resonant frequency from one resonant cavity $20_i$ to the next.

In general, the resonant cavities $20_i$ may be produced using thin-layer deposition techniques. Thus, the resonant cavities $20_i$ may be made of one or more dielectric materials, or of one or more semiconductor materials. By way of example, they may be made of III-V crystalline semiconductor compounds, for example based on arsenic As, by means of an epitaxial growth technique such as molecular beam epitaxy (MBE), or by means of metal organic chemical vapour deposition (MOCVD). The layers of the Bragg mirrors 21.1, 21.2 may also be made from amorphous dielectric compounds deposited using CVD, for example based on $SiO_2$ and $TiO_2$.

By way of example, the substrate 3 may thus be made of GaAs. The Bragg mirrors may be produced by alternating crystalline thin layers of GaAs and of AlAs, for example by alternating 24 pairs of a thin layer of GaAs with a thickness of 65 nm and a thin layer of AlAs with a thickness of 80 nm for the lower Bragg mirror 21.1, and by alternating 20 pairs of a thin layer of AlAs with a thickness of 80 nm and a thin layer of GaAs with a thickness of 65 nm for the upper Bragg mirror 21.2. This interlayer 22 may be made of GaAs with a thickness of 8580 nm.

It should be noted here that the interlayer 22 has a thickness equal to $k \times \lambda_{r(0)}/2n$, where k is an integer, and n is the refractive index of GaAs at the wavelength $\lambda_{r(0)}$. It is advantageous for k to be large, for example equal to about 60, and not equal to 2 as is usually the case in the resonant cavities $20_i$ used, for example, in surface-emitting lasers. Thus, a high value for the thickness of the interlayer 22 helps to obtain a high quality factor Q (and therefore a long storage time r).

Figure 5A:
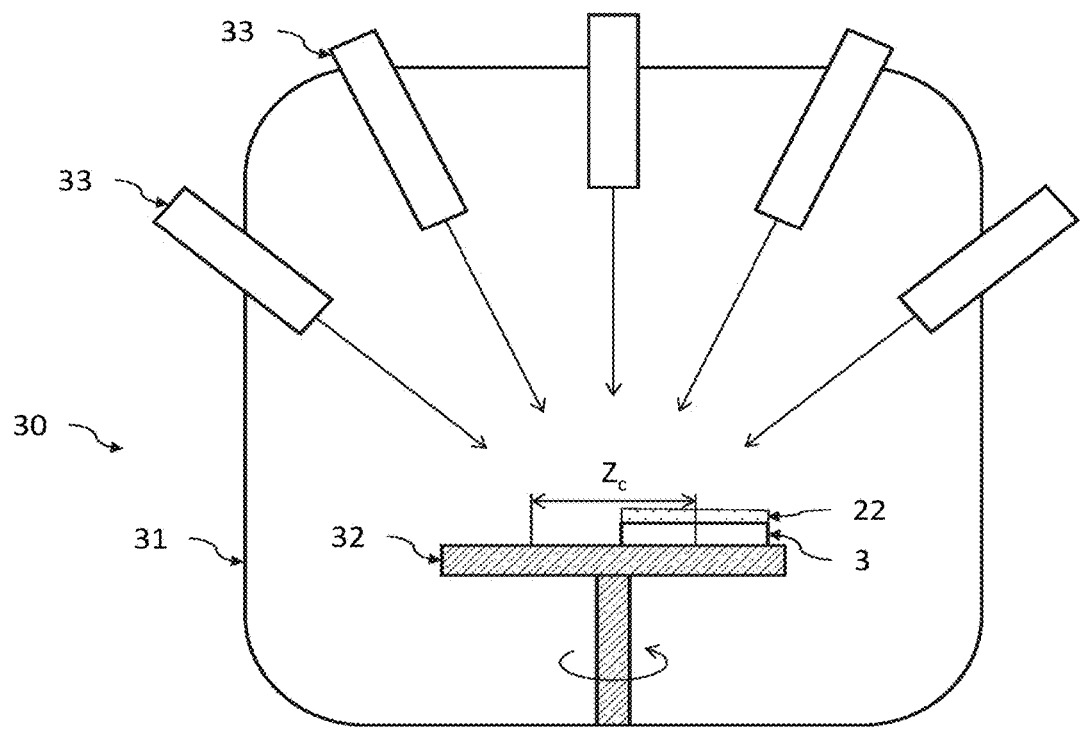
FIG. 5A is a schematic partial view, in cross section, of a molecular-beam epitaxy (MBE) reactor illustrating the positioning of a growth substrate allowing an interlayer exhibiting a monotonic variation in its thickness to be produced.
Figure 5B:
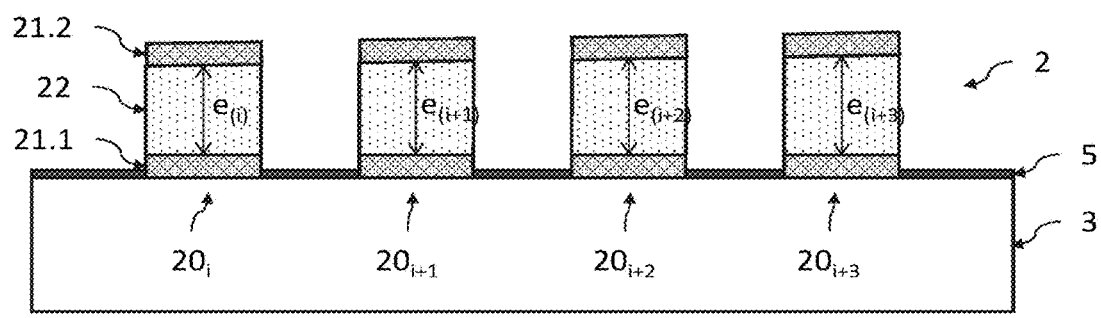
FIG. 5B is a schematic partial view, in cross section, of an array of resonant cavities in a structured configuration (see FIG. 2A), for which the thickness of the interlayer exhibits a monotonic variation along an axis of the array.

FIG. 5A schematically and partially illustrates an MBE reactor 30 which may be used to produce an interlayer 22 whose thickness exhibits a monotonic variation along a predefined axis, with a view to obtaining the monotonic variation in the resonant frequencies of the resonant cavities $20_i$. This variation in the thickness along a predefined axis is obtained by placing the substrate off-centre with respect to the axis of rotation of the sample. FIG. 5B is schematic partial view, in cross section, of an array 2 of resonant cavities $20_i$ in the structured configuration of FIG. 2A, showing the variation in the thickness $e_{(i)}$ of the resonant cavities $20_i$ along the second, Y-axis of the array.

With reference to FIG. 5A, the MBE reactor 30 comprises a chamber 31 in which a support turntable 32 is located on which the interlayer 22 is intended to be produced. The turntable 32 is intended to rotate on itself in the deposition phase. Evaporation sources 33 for the chemical elements are arranged facing the turntable 32, for example a Ga source and an As source.

The MBE reactor 30 is configured so that the optimal epitaxial growth region is located in a central region $Z_c$ of the turntable 32, such that the deposited layer has a uniform thickness in the XY-plane. Thus, with a view to obtaining an interlayer 22 exhibiting a monotonic variation in its thickness along a given axis, the growth substrate 3 is placed offset with respect to the central region $Z_c$. Thus, if a thickness e at y=0 (located on the axis of rotation of the turntable 32) of the interlayer 22 corresponds to a resonant frequency $f_r(y=0)$ for a resonant cavity of order O such that: $f(y=0) = O \times c/(n \times e(y=0))$, it is then known that the resonant frequency $f_r(y)$ will vary along the second, Y-axis of the array according to the relationship: $f(y) = O \times c/(n \times e(y))$.

In the case of the structured configuration (FIG. 2A), account is advantageously taken of the fact that the lateral confinement of the resonant mode brings about AN offset in the resonant frequency $f_r$ with respect to the case in which the resonant mode is not confined in the XY-plane. The resonant frequency $f_r$ is then expressed as follows, as a function of the index i of the resonant cavity:

$$f_{r(i)} = f_r(i \times P) + \frac{c^2}{8n^2 L_y^2 f_r(i \times P)} \quad (8)$$

The difference Δ between the resonant frequencies of two adjacent resonant cavities $20_{(i)}$, $20_{(i+1)}$ may be written, to the first order (i.e. in the desired case in which the thickness gradient $\nabla_y e(y)$ is very low):

$$\Delta = f_{r(i+1)} - f_{r(i)} = P \times \frac{df}{dy} = f_{r(y=0)} \times \frac{de}{dy}(y=0) \times \frac{P}{e(y=0)} \quad (9)$$

Once the stack of the Bragg mirrors and of the interlayer 22 has been obtained, the resonant cavities $20_i$ may be formed by locally etching the planar stack 4 (structured configuration of FIG. 2A).

It should be noted that, as a variant or in addition, the monotonic variation in the resonant frequencies of the resonant cavities $20_i$ may, in this structured configuration, be obtained by varying the width $L_y$ of the resonant cavities $20_i$. Specifically, as shown by equation (8) above, the width $L_y$ affects the lateral confinement of the resonant mode and therefore the resonant frequency.

Furthermore, as a variant or in addition, it is possible to obtain the monotonic variation in the resonant frequencies of the resonant cavities $20_i$ by varying the local refractive index of the interlayer 22 of the resonant cavities $20_i$. By way of example, such a monotonic variation may be obtained via thermooptic effect, by means of local Joule heating of each resonant cavity by a heater. The heater may be a conductive wire at the foot of each resonant cavity, for example in an intermediate layer arranged along the Z-axis between the substrate 3 and the resonant cavities 20$_i$.

Lastly, as a variant or in addition, the variation in the local refractive index of the material of the interlayer 22, from one resonant cavity 20$_i$ to the next, may be obtained by injecting an electron-hole plasma into the semiconductor material via optical pumping. A second optical source of a potentially continuous pump signal, and a spatial intensity modulator, may be arranged facing the array 2 of resonant cavities 20$_i$, at the front face or back face thereof, so as to inject electron-hole pairs into the various resonant cavities 20$_i$, and thereby generate a variation in the refractive index of the material of the interlayer 22 from one resonant cavity 20$_i$ to the next. In the case of a two-dimensional array of identical resonant cavities, these approaches may make it possible to define the direction of introduction of a variation in the resonant frequency, and therefore the plane in which the far-field scanning is obtained.

Particular embodiments have just been described. Various modifications and variants will be obvious to anyone skilled in the art.

The invention claimed is:

1. An optoelectronic emitter with angular scanning, comprising:
    an array of resonant cavities, resting on a substrate defining a main plane, the resonant cavities being:
        arranged parallel to one another and each extending longitudinally along a first axis of the array,
        each formed of a stack of two opposing reflectors and of an interlayer located between the reflectors, and having an emission face opposite the substrate,
        each designed to emit, via the emission face, an elementary light beam at a resonant frequency specific to each resonant cavity, in response to a pulsed optical excitation signal,
        each having a light storage time that is dependent on reflection coefficients of the reflectors, and a thickness and a refractive index of the interlayer; and
    configured to exhibit a variation in the resonant frequencies from one resonant cavity to the next, along a second axis of the array perpendicular to the first axis, so as to cause the angular scanning of the optoelectronic emitter to take place in a plane perpendicular to that of the substrate and containing the second axis; and
    an optical source configured to emit the pulsed optical excitation signal so as to illuminate and excite all of the resonant cavities simultaneously, the pulsed optical excitation signal being coherent, with a pulse duration shorter than the light storage time of each of the resonant cavities, and with a spectral width centered on a central frequency, the spectral width of the central frequency being predefined so as to cover a range of resonant frequencies of the resonant cavities.

2. The optoelectronic emitter according to claim 1, wherein the resonant cavities are configured so that the storage time is equal to $1/\Delta$, where $\Delta$ is a difference between the resonant frequencies of adjacent resonant cavities.

3. The optoelectronic emitter according to claim 1, wherein the resonant cavities are configured so as to exhibit a variation in the resonant frequencies from one resonant cavity to the next that is smaller than or equal to 1%.

4. The optoelectronic emitter according to claim 1, wherein the resonant cavities are configured such that the variation in the resonant frequencies is monotonic.

5. The optoelectronic emitter according to claim 1, wherein the variation in the resonant frequencies results from a variation, along the second axis of the array:
    in a thickness of the interlayers, from one resonant cavity to the next, the thickness being defined along an axis perpendicular to the main plane, and/or
    in a refractive index of the interlayers, from one resonant cavity to the next.

6. The optoelectronic emitter according to claim 1, wherein the resonant cavities are pads that are distinct from one another distributed over the substrate, and each resonant cavity is delimited by lateral flanks that are substantially perpendicular to the substrate.

7. The optoelectronic emitter according to claim 6, wherein the variation in resonant the frequencies results from a variation, along the second axis of the array, in a width of the resonant cavities along the second axis of the array.

8. The optoelectronic emitter according to claim 1, wherein the resonant cavities are regions of one and a same stack formed of the reflectors and of the interlayer, the stack being covered by a thin layer that is opaque at a wavelength of elementary light beams, the thin layer comprising through-openings defining an emission surface of the resonant cavities.

9. The optoelectronic emitter according to claim 1, wherein the resonant cavities have a width along the second axis of the array and a length along the first axis of the array, the length and the width being greater and smaller, respectively, than a lateral dimension of a resonant mode in a planar resonant cavity with infinite dimensions in the main plane, the lateral dimension being predefined according to a resonant wavelength of a reference resonant cavity of the array, the thickness and the refractive index of the corresponding interlayer, and reflection coefficients of the two reflectors.

10. The optoelectronic emitter according to claim 1, wherein the resonant cavities are produced based on III-V semiconductor or dielectric compounds, and/or the reflectors are Bragg mirrors.

11. The optoelectronic emitter according to claim 1, wherein the interlayer of a central resonant cavity of the array has a thickness equal to $k \times \lambda_{r(o)}/2n$, where k is an integer, $\lambda_{r(o)}$ is a resonant wavelength of the central resonant cavity, and n is a refractive index of the corresponding interlayer.

12. The optoelectronic emitter according to claim 1, wherein a scanning angular velocity is predefined according to a difference between the resonant frequencies of two adjacent resonant cavities, a resonant wavelength of a central resonant cavity of the array, and a pitch of a spatial arrangement of the resonant cavities along the second axis of the array.

13. The optoelectronic emitter according to claim 1, wherein a width of an angular sector scanned by the main light beam is predefined according to a resonant wavelength of a central resonant cavity of the array and a width of the resonant cavities along the second axis of the array.

14. The optoelectronic emitter according to claim 13, wherein an angular width of the main light beam is predefined according to the width of the angular sector and a total number of resonant cavities.

15. A method for producing an optoelectronic emitter according to claim 1, wherein the variation in resonant frequencies is brought about by a variation in the thickness of the interlayer of the resonant cavities along the second axis of the array, the method comprising:

a step of producing a stack to form the array of resonant cavities, the stack being produced in a reactor, on a turntable, starting from a position that is laterally offset with respect to an axis of rotation of the turntable in relation to a reference position for which the thickness of the interlayer exhibits a uniform thickness.

\* \* \* \* \*